C. HERSOME.

Gaiter-Boot.

No. 6,328.

Reissued March 9, 1875.

WITNESSES.

Wesley Dinsmore.

Robert Morris Jr.

INVENTOR

C. Hersome

Per Brown Bros.

Attorneys

THE GRAPHIC CO. PHOTO-LITH. 39 & 41 PARK PLACE, N.Y.

UNITED STATES PATENT OFFICE.

CALVIN HERSOME, OF BOSTON, MASSACHUSETTS.

IMPROVEMENT IN GAITER-BOOTS.

Specification forming part of Letters Patent No. 145,801, dated December 23, 1873; reissue No. 6,328, dated March 9, 1875; application filed November 21, 1874.

*To all whom it may concern:*

Be it known that I, CALVIN HERSOME, of Boston, county of Suffolk and State of Massachusetts, have invented an Improvement in Gaiter-Boots, of which the following is a specification:

This invention relates to gaiter-boots, such as described in the Letters Patent dated November 19, 1872, No. 113,225, issued to me, or, in other words, to gaiter-boots having flaps which surround the foot above the ankle, and are there secured in place by a strap which buckles about the back of the foot just above the ankle.

The main purpose of this invention is to hold that part of the gaiter which is at the back of the foot, and which is crossed by the fastening-straps, from working or slipping downwardly upon the foot, and to hold the fastening-strap from working upwardly on the gaiter, and thereby prevent the slipping of the gaiter at the heel upon the foot, and under the invention this purpose is secured by placing a stop or check on the gaiter at said back part, to co-operate with the fastening-strap in such a manner that the back part cannot work downwardly or the fastening-strap work upwardly on the foot, thereby holding the gaiter against slipping at the heel.

Figure 1:
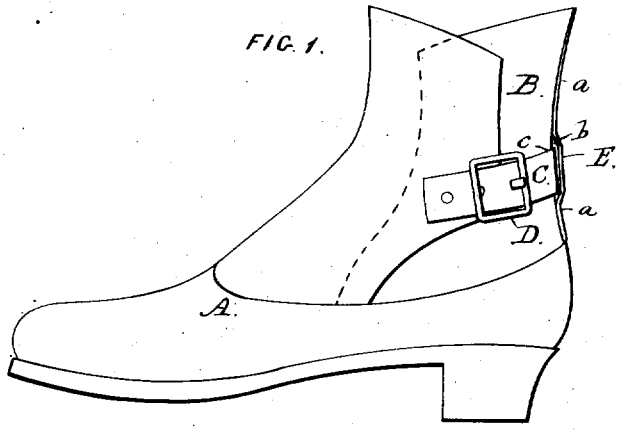
Figure 2:
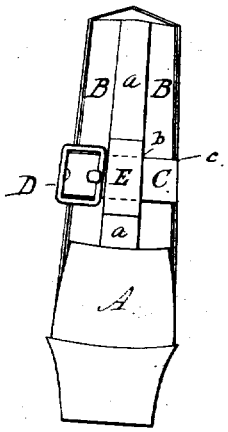

In the accompanying plate of drawings this invention is illustrated in connection with my said patented gaiter, Figure 1 being a side view, and Fig. 2 a rear view, of the gaiter.

In the drawings, A represents the gaiter; B, the flap or part surrounding the ankle at the back of the foot; C, the fastening-strap, and D the buckle for buckling the strap about the back of the gaiter, all substantially as described in my said patent; E, a loop, check, or stop constructed or located on the back flap or part B, in the same line with that in which the fastening-strap crosses the said back part when it is buckled in the buckle D. This loop is made by stitching a leather strap, *a*, to the back flap, and the loop opens toward each side of the boot, so that the strap C can be drawn through it in being buckled about the back of the boot. The upper end or wall *b* of the loop E obviously secures the rest of the back part B of the gaiter upon the upper edge *c* of the fastening-strap, and as the said strap, when buckled, is fast at each side of the foot, the back part of the gaiter is held from working or slipping downwardly, and the fastening-strap from working vertically upon the foot, and thus the slipping of the gaiter at the heel is prevented, the importance of which is obvious. The loop E, forming a stop or check to limit the vertical play of the strap, also confines the fastening-strap closely to the gaiter, and obviously possesses other advantages not necessary to herein recite.

Having thus described my invention, I will state my claim as follows:

The combination, with a fastening-strap passing from the vamp or instep-piece around the back of a shoe, of a check or stop to limit the vertical play of the strap.

CALVIN HERSOME.

Witnesses:

ALBERT W. BROWN,

EDWIN W. BROWN.